(12) United States Patent
Belser et al.

(10) Patent No.: US 6,411,459 B1
(45) Date of Patent: Jun. 25, 2002

(54) ADVANCED SERVO WRITING METHOD FOR HARD DISC DRIVES

(75) Inventors: Karl A. Belser, San Jose, CA (US); Alexei H. Sacks, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/504,192

(22) Filed: Feb. 15, 2000

Related U.S. Application Data

(60) Provisional application No. 60/121,161, filed on Feb. 22, 1999.

(51) Int. Cl.[7] ............................................. G11B 21/02
(52) U.S. Cl. ......................... 360/75; 360/48; 360/77.08
(58) Field of Search ........................ 360/75, 48, 77.08, 360/77.02, 77.05, 77.11

(56) References Cited

U.S. PATENT DOCUMENTS

| | | | |
|---|---|---|---|
| 3,540,022 A | 11/1970 | Berger ...................... 340/174.1 |
| 3,881,184 A | 4/1975 | Koepcke et al. ............... 360/78 |
| 4,068,218 A | 1/1978 | Likuski ....................... 365/237 |
| 4,107,746 A | 8/1978 | Conway ....................... 360/78 |
| 4,371,902 A | 2/1983 | Baxter et al. .................. 360/75 |
| 4,414,589 A | 11/1983 | Oliver et al. .................. 360/77 |
| 4,530,019 A | 7/1985 | Penniman ..................... 360/77 |
| 4,530,020 A | 7/1985 | Sutton ......................... 360/77 |
| 4,531,167 A | 7/1985 | Berger ......................... 360/77 |
| 4,561,028 A | 12/1985 | Guisinger ..................... 360/77 |
| 4,586,094 A | 4/1986 | Chambors et al. ............. 360/77 |
| 4,598,327 A | 7/1986 | Jen et al. ...................... 360/77 |
| 4,642,709 A | 2/1987 | Vinal .......................... 360/77 |
| 4,729,048 A | 3/1988 | Imakoshi et al. ............. 360/103 |
| 4,734,900 A | 3/1988 | Davie .......................... 369/59 |
| 4,809,091 A | 2/1989 | Miyazawa et al. ............. 360/48 |
| 4,879,608 A | 11/1989 | Sano ........................... 360/51 |
| 4,910,616 A | 3/1990 | Sirai et al. ................ 360/77.08 |
| 4,912,576 A | 3/1990 | Janz ........................ 360/77.07 |
| 4,942,484 A | 7/1990 | Nigam ......................... 360/46 |
| 4,945,427 A | 7/1990 | Cunningham ................. 360/75 |
| 4,969,056 A | 11/1990 | Negishi et al. ................ 360/66 |
| 4,980,783 A | 12/1990 | Moir et al. ............... 360/77.02 |
| 5,003,412 A | 3/1991 | Bizjak et al. ............. 360/77.01 |
| 5,012,363 A | * 4/1991 | Mine et al. ............... 360/77.05 |
| 5,109,307 A | 4/1992 | Sidman .................... 360/77.05 |
| 5,119,248 A | 6/1992 | Bizjak et al. .................. 360/75 |
| 5,164,866 A | 11/1992 | Sano et al. ............... 360/77.08 |
| 5,175,719 A | 12/1992 | Iimura ......................... 360/58 |
| 5,193,034 A | 3/1993 | Tsuyoshi et al. ............... 360/51 |
| 5,202,802 A | 4/1993 | Sidman .................... 360/77.05 |
| 5,229,901 A | 7/1993 | Mallary ....................... 360/104 |
| 5,241,433 A | 8/1993 | Anderson et al. ......... 360/77.04 |
| 5,256,965 A | 10/1993 | Nomura ...................... 324/212 |
| 5,321,560 A | 6/1994 | Cowen ......................... 360/48 |
| 5,339,207 A | 8/1994 | Moon et al. .............. 360/77.05 |
| 5,416,652 A | 5/1995 | Lewis .......................... 360/48 |

(List continued on next page.)

FOREIGN PATENT DOCUMENTS

| | | |
|---|---|---|
| EP | 0 437 947 A2 | 7/1991 |
| EP | 0 484 779 A2 | 5/1992 |
| GB | 2 280 302 A | 1/1995 |

*Primary Examiner*—David Hudspeth
*Assistant Examiner*—Dan I. Davidson
(74) *Attorney, Agent, or Firm*—Westman, Champlin & Kelly, P.A.

(57) ABSTRACT

A method of writing servo information for hard disc drives, and disc drives built according to the method are disclosed. The method includes writing position reference information on a reference disc surface prior to mounting a disc assembly into a hard disc drive. Once the disc assembly is mounted in the disc drive, servo information is written onto the disc surfaces based upon the pre-written position reference information. Subsequently, the position reference information can be erased or written over by user data.

14 Claims, 3 Drawing Sheets

U.S. PATENT DOCUMENTS

| | | | |
|---|---|---|---|
| 5,444,583 A | 8/1995 | Ehrlich et al. | 360/78.09 |
| 5,448,429 A | 9/1995 | Cribbs et al. | 360/75 |
| 5,465,182 A | 11/1995 | Ishikawa | 360/75 |
| 5,475,291 A | 12/1995 | Yoshida et al. | 318/568.22 |
| 5,485,322 A | 1/1996 | Chainer et al. | 360/51 |
| 5,517,371 A | 5/1996 | Takei | 360/77.02 |
| 5,541,784 A | 7/1996 | Cribbs et al. | 360/75 |
| 5,570,247 A | 10/1996 | Brown et al. | 360/75 |
| 5,581,420 A | 12/1996 | Chainer et al. | 360/75 |
| 5,606,469 A | 2/1997 | Kosugi et al. | 360/77.05 |
| 5,612,833 A | 3/1997 | Yarmchuck et al. | 360/75 |
| 5,615,058 A | 3/1997 | Chainer et al. | 360/51 |
| 5,659,436 A | 8/1997 | Yarmchuck et al. | 360/75 |
| 6,130,796 A | 10/2000 | Wiselogel | |

* cited by examiner

ADVANCED SERVO WRITING METHOD FOR HARD DISC DRIVES

CROSS-REFERENCE TO RELATED APPLICATIONS

This application claims the benefit of U.S. Provisional Patent Application No. 60/121,161, which is entitled "ADVANCED SERVO WRITING METHOD FOR HARD DISC DRIVES" and was filed on Feb. 22, 1999.

Cross-reference is made to U.S. Ser. No. 09/152,356, filed on Sep. 14, 1998 and entitled "TRACK POSITION ID INFORMATION"; to U.S. Ser. No. 09/425,768 filed on Oct. 22, 1999 and entitled "METHOD AND APPARATUS FOR THERMALLY WRITING SERVO PATTERNS ON MAGNETIC MEDIA"; to U.S. Ser. No. 09/425,576, filed Oct. 22, 1999 and entitled "METHOD AND APPARATUS FOR ENCODING IDENTIFICATION INFORMATION ON A MAGNETIC DISC"; to U.S. Ser. No. 09/209,902, filed on Dec. 11, 1998 and entitled "PHOTO SERVO PATTERNING ON MAGNETO-OPTICAL MEDIA"; and to U.S. Ser. No. 09/130,657, filed Aug. 7, 1998 and entitled "HARD DISC PATTERNING", which are assigned to the same assignee as the present application.

BACKGROUND OF THE INVENTION

The present invention relates to data storage devices and, in particular, to a method of encoding servo information on discs used in a hard disc drive.

A typical disc drive storage system includes one or more magnetic discs which are mounted for co-rotation on a hub or spindle. A typical disc drive also includes a transducer supported by a hydrodynamic bearing which flies above each magnetic disc. The transducer and the hydrodynamic bearing are collectively referred to as a data head. A drive controller is conventionally used for controlling the disc drive based on commands received from a host system. The drive controller controls the disc drive to retrieve information from the magnetic discs and to store information on the magnetic discs. An electromechanical actuator operates within a negative feedback, closed-loop servo system to move the data head radially or linearly over the disc surface for track seek operations and holds the transducer directly above a desired track or cylinder on the disc surface for track following operations.

Information is typically stored in concentric tracks on the surface of the magnetic discs by providing a write signal to the data head to encode flux reversals on the surface of the magnetic discs representing the data to be stored. In retrieving data from the discs, the drive controller controls the electromechanical actuator so that the data head flies above the desired track or cylinder on the magnetic discs, sensing the flux reversals on the magnetic discs, and generating a read signal based on those flux reversals.

In an embedded servo-type system, servo information or (servo bursts) is recorded on data tracks which also contain stored data. The servo bursts are typically temporally spaced evenly about the circumference of each data track. Data is recorded on the data tracks between the servo bursts. In a dedicated servo-type system, an entire disc surface in a disc drive is dedicated to storing the servo information.

As the data head reads the servo information, the transducer provides a position signal which is decoded by a position demodulator and presented in digital form to a servo control processor. The servo control processor essentially compares the relative position error to the track center and commands the actuator to move in order to minimize position error.

Generally, the servo information is written on the disc surfaces during manufacture of the disc assembly. Each disc assembly is mounted to a servo writer support assembly which precisely locates the disc surfaces relative to a reference or origin. The servo writer support assembly supports a position sensor, such as laser light interferometer, which detects the position of the actuator relative to the disc surfaces. The position sensor is electrically inserted within the disc drive's negative feedback, closed-loop servo system for providing position information to the servo system while the servo data is being written to the disc surfaces. The servo writer support assembly may also support a clock writer transducer which writes a clock pattern onto the disc surface which is used for temporally spacing the servo data about the circumference of each track.

Using a servo writer support assembly to write servo information typically requires many minutes for each disc assembly. Such time slows manufacturing throughput and potentially increases the cost of the finished product. Another limitation is that the servo patterns generally consume about 5% to 10% of the usable recording area in a given disc drive. Further, it is difficult to align the product head skew to the orientation of the pre-written servo patterns. Further still, it is also difficult to align the discs such that the tracks are circular and centered at the spindle rotating center. Yet another limitation is due to the difficulty of aligning the radial positions of the product heads from surface-to-surface-to produce cylinders.

Another known technique for writing servo information uses the disc drive itself to write the servo information in situ. In Situ recording means that the servo patterns are recorded on a fully assembled drive by controlling the position of the actuator arm using the product actuator with feedback from previously written tracks and recording the servo information with the product head. However, one limitation that has generally limited self-servowriting techniques is that disturbances inherent in the drive itself, such as disc flutter and spindle non-repeatable runout (NRRO), limit the radial and circumferencial accuracy of the position sensing pattern.

As industry continues to press disc drive manufacturers to provide disc drives with increased storage capacity at lower costs, it is becoming increasingly important to provide disc drives with high track densities while minimizing manufacturing time and labor costs.

The present invention addresses these and other problems, and offers other advantages over the prior art.

SUMMARY OF THE INVENTION

A method of writing servo information for hard disc drives is disclosed. The method includes writing position reference information on a reference disc surface prior to mounting a disc assembly into a hard disc drive. In some embodiments, the position reference information is written at a frequency that is lower than about 5 MHz. In other embodiments, the drive servo frequency can be used. Once the disc assembly is mounted in the disc drive, servo information is written onto the disc surfaces based upon the pre-recorded position reference information. Subsequently, the previously recorded position reference information can be erased or written over. These and other features and benefits of the present invention will become apparent upon reading the following detailed description and review of the associated drawings.

DETAILED DESCRIPTION OF THE PREFERRED EMBODIMENTS

Figure 1:
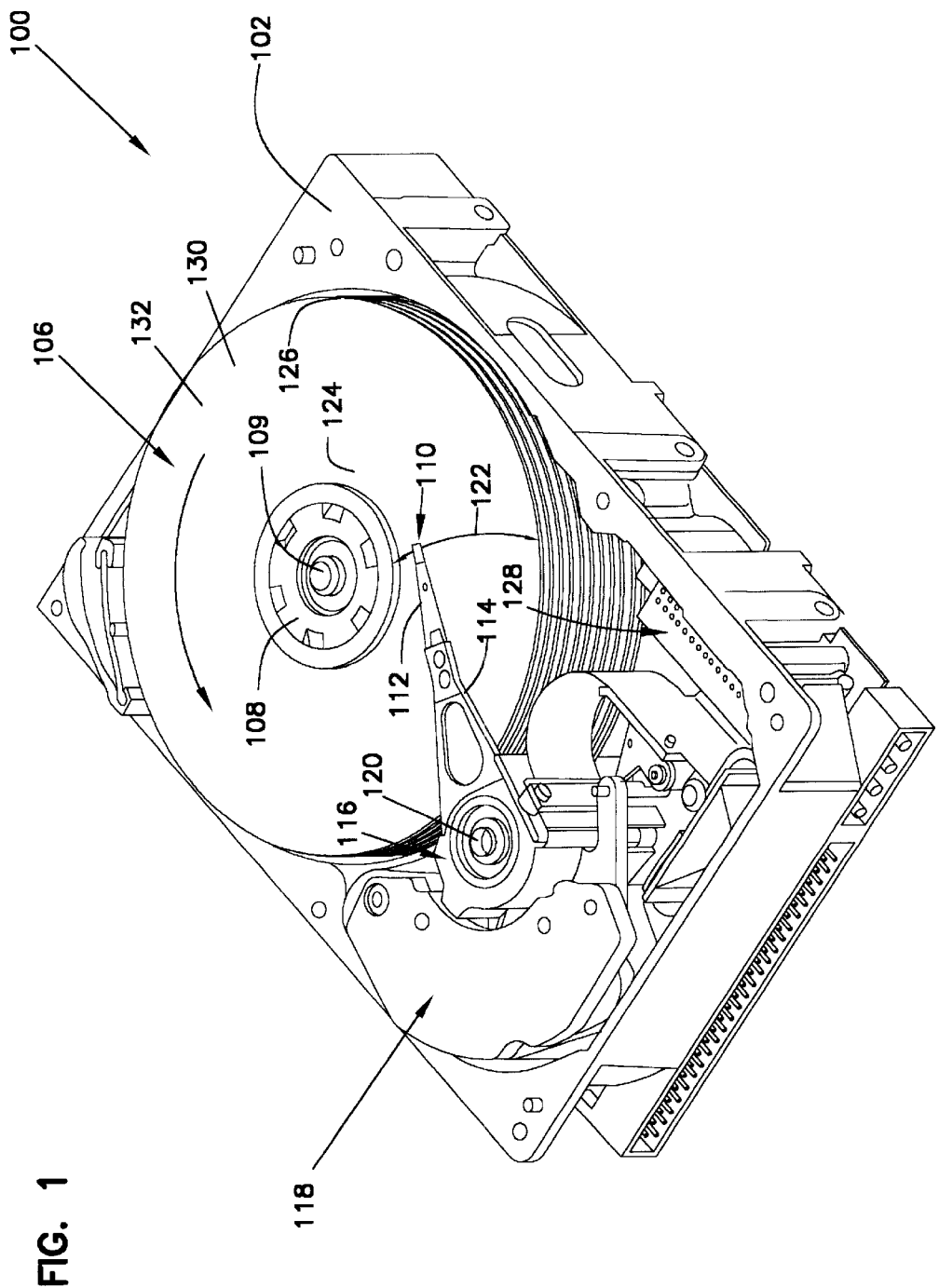
FIG. 1 is a plan view of a disc drive with which the present invention is useful.

FIG. 1 is a perspective view of a disc drive 100 which includes a housing with a base 102 and top cover (not shown). Disc drive 100 further includes a disc assembly 106, which is mounted on a spindle motor (not shown) by a disc clamp 108. Disc assembly 106 includes a plurality of individual discs, which are mounted for co-rotation about central axis 109. Each disc surface has an associated head 110, which is mounted to disc drive 100 for communication with the disc surface. In the example shown in FIG. 1, heads 110 are supported by suspensions 112, which are in turn attached to track accessing arms 114 of an actuator 116. The actuator shown in FIG. 1 is a known voice coil motor (VCM), shown generally at 118. Actuator assembly 116 is rotated about a shaft 120 by voice coil motor 118, which is controlled by servo control circuitry within internal circuit 128, to move heads 110 in an arcuate path 122 between a disc inner diameter 124 and a disc outer diameter 126. Servo information, such as servo bursts, is embedded in the data tracks on each disc surface of disc assembly 106. Data is recorded circumferentially in the data tracks between the servo bursts. As actuator assembly 116 positions heads 110 over a desired data track, the read transducer in head 110 reads the stored information from the disc surface. The servo control circuitry within internal circuit 128 compares the recovered, embedded servo information with a desired radial position for head 110 and commands actuator assembly 116 to move in order to minimize position error.

Figure 2:
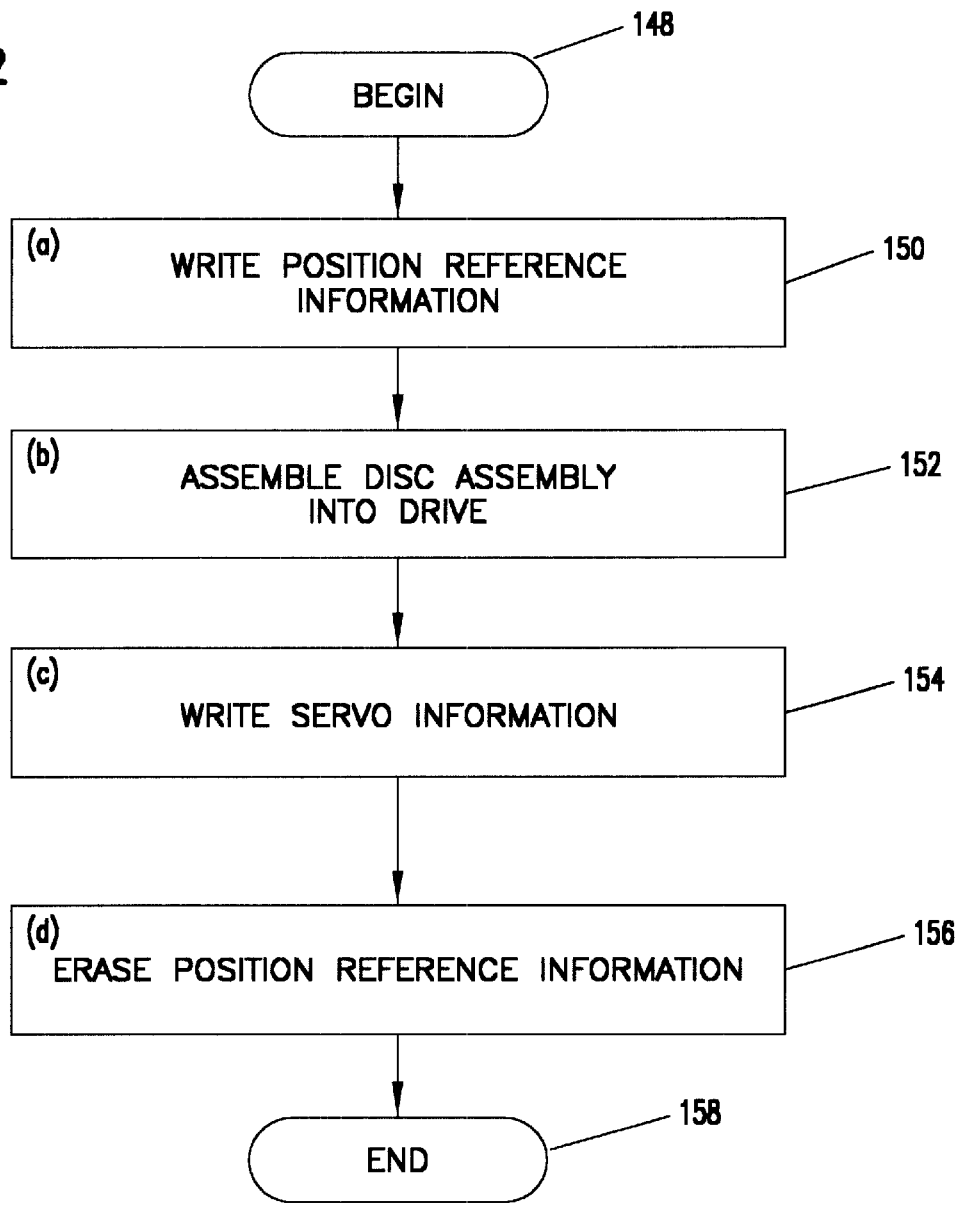
FIG. 2 is a flow chart of a method in accordance with one embodiment of the present invention.

FIG. 2 is a flow chart of a method comparing steps 148 through 158 in accordance with one embodiment of the present invention. The method 148 begins at block 150 where position reference information is pre-written upon reference disc surface 130 (shown in FIG. 1), before disc assembly 106 is mounted into disc drive 100. The pre-writing can be performed upon a single disc, or on a reference disc surface in a disc assembly. In embodiments where the pre-writing is performed upon a single disc, the single disc is assembled into a disc assembly with other, unwritten, discs prior to mounting the disc assembly in the disc drive. In one embodiment, position reference information is stored on substantially all of reference disc surface 130. The pre-written position reference information can be written by mounting the disc(s) to an air bearing spindle, and causing the heads to write information while being exactly positioned by an actuator. Although use of an air bearing spindle is preferred, other types of spindles such as ball bearing, or liquid bearing spindles can be used. The pre-written position reference information can be written at a relatively lower rotational speed and frequency than are generally used during operation of the disc drive. In some embodiments, the frequency is within a range of about 50 Hz to about 5 MHz. Such low frequency writing may facilitate subsequent reading of the position reference information in the disc drive despite the presence of head skew.

The position reference information can be recorded in any appropriate manner. For example, the position reference information can be written in accordance with known techniques for writing servo information. In some embodiments, the position reference information is written in a manner that facilitates interpolation between tracks. The position reference information can be written using any appropriate apparatus. For example, a know servo track writer can be used.

Figure 3:
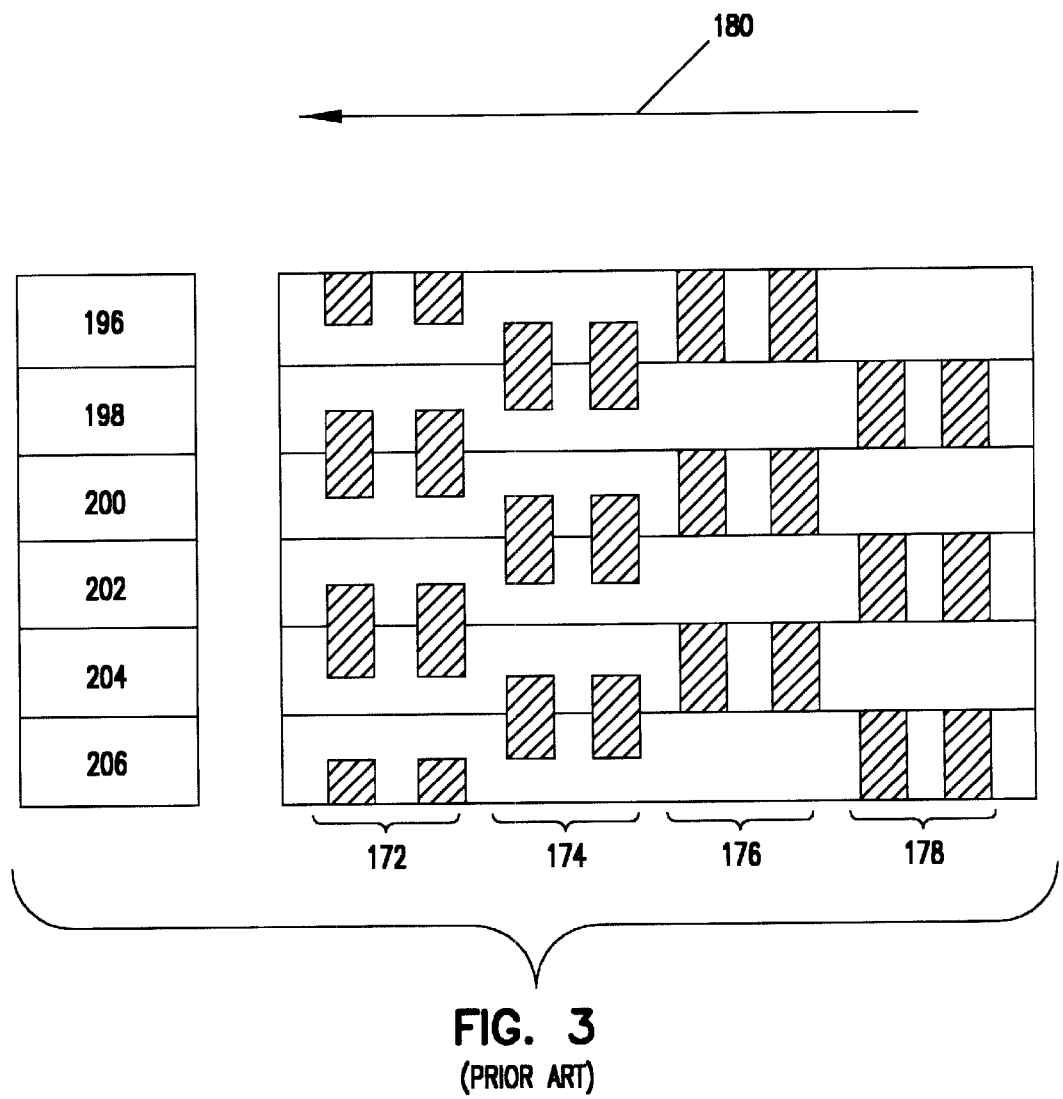
FIG. 3 is a diagrammatic view of a pattern of position information usable with embodiments of the present invention.

An illustrative servo pattern is shown in FIG. 3. The pattern shown in FIG. 3 is known as an amplitude servo pattern. Bursts 172 and 174 are disposed on opposite sides of centerlines of tracks 196, 198, 200, 204, and 206. When a transducer is directly centered over a given track, the position error signal will have equal components from bursts 172 and 174. Thus, a position error signal, based upon subtracting the amplitudes of bursts 172 and 174 from one another, will have a value of zero when the transducer is positioned directly above the track centerline. In order to facilitate control, bursts 176 and 178 can be provided to create a signal that is 90° out of phase in the radial direction (quadrature) with the 172, 174 burst signal. The pattern shown in FIG. 3 is exemplary only, and a variety of other patterns can be used, such as phase encoded servo patterns (where positioning information is stored in the phase of the servo pattern), a null pattern, time-based methods, and multi-frequency based methods, as well as any other pattern that provides information indicative of position. The pattern can be written using any appropriate technique. For example, the methods taught in U.S. patent application Ser. No. 09/425,768 filed Oct. 22, 1999 and entitled, "METHOD AND APPARATUS FOR THERMALLY WRITING SERVO PATTERNS ON MAGNETIC MEDIA" can be used to write the position reference information. Further, known photolithographic techniques can be employed to impart the position reference information upon the disc. Additionally, if the position reference information allows effective interpolation, the radial intervals between the position reference information need not correspond to each track of the disc. For example, the position reference information can be written at a radial interval of two tracks or even ten tracks.

Once the position reference information is written to the reference disc surface, disc assembly 106 is mounted in hard disc drive 100, in a manner known in the art, as indicated by block 152 in FIG. 2.

At block 154, servo information is written on selected disc surface 132 of the magnetic disc assembly based upon the position reference information, while the magnetic disc assembly is mounted within the hard disc drive. The servo information is preferably of the type typically used in embedded servo systems.

As discussed above, the pre-written information is written outside of the disc drive, and thus is recorded using a mechanical system that differs from the hard disc drive. Although this feature allows the position reference information to be written more accurately, and at lower rotational speeds than operational speeds, the tracks of position reference information will, to some extent, deviate from a perfectly circular shape once the assembly is rotating within the drive. A number of techniques are known by which the tracks of servo information can be made substantially circular despite the fact that the position reference information is not perfectly circular. Generally such techniques allow a circular average to be calculated based upon repeatable parameters. One such technique calculates circular tracks as a function of the minimal coil current required to follow the position reference information. Another technique is set forth in U.S. patent application Ser. No. 09/106,443, filed Jun. 29,1998, entitled "COMPENSATION FOR REPEATABLE RUNOUT ERROR", assigned to the same assignee as the present application.

At block 156, the remaining pre-written position information, that which was not overwritten, is erased. Once the position information is erased, the space previously consumed by the position information is made available for storing consumer data.

Although the servo information written to the selected surface can theoretically indicate position of all heads with respect to the discs, in practice, servo information will be written to each disc surface based upon the servo information written upon the selected disc surface. Thus, any head 110 can provide a position error signal indicative of the position of the transducer with respect to a data track. Such configuration provides enhanced positioning that is less affected by thermal expansion and contraction of suspension 112, or arms 114. Therefore, in some embodiments, servo information is written to all remaining surfaces in the disc assembly based upon the servo information written to selected surface 132. This assisted self-servowriting provides all of the advantages of traditional embedded servo systems while requiring relatively little time to pre-write to position reference information.

In summary, one aspect of the present invention relates to a method of writing servo information in a hard disc drive. In contrast to traditional disc drive assembly methods, where embedded servo information is pre-written on each disc surface, embodiments of the present invention store position reference information on one disc surface. Thus, much less time is required for the pre-writing step than was previously required. Since servo information is self-written using the reference tracks when the discs are installed in the drive, less time is required than with pre-written disc techniques. However, since a pre-written position reference assists in the writing of servo information within the disc, the self-writing can be performed in less time than that required for traditional self-servowriting techniques. For example, where the time required to write servo information in traditional self-servowriting devices is related to the number of tracks cubed ($n^3$), embodiments of the present invention can effect the assisted self-servowriting in times on the order of the number of tracks (n). When track densities are higher than 20,000 tracks per inch, the time savings becomes quite significant. Additionally, because the servo information is written based upon position reference information written outside of the disc drive, error propagation, generally associated with self-servowriting, is alleviated.

In one embodiment, a method of manufacturing a hard disc drive having a magnetic disc assembly with a plurality of disc surfaces is provided. The method includes step (a) where position reference information is written on a reference disc surface 130 of the magnetic disc assembly 106, before the magnetic disc assembly 106 is mounted within the hard disc drive 100. In some embodiments, the position information is written over substantially all of the reference disc surface 130. At step (b), the magnetic disc assembly 106 is mounted within the hard disc drive 100. Once the disc assembly 106 is mounted within the hard drive 100, step (c) is performed where servo information is written on a selected disc surface 132 (which may be the reference disc surface 130) of the magnetic disc assembly 106 based upon the position reference information. Finally, the position reference information can be erased in order to accommodate user data. In one embodiment, all surfaces within the disc assembly 106 are written with servo information based upon the servo information written upon the selected surface 132. In some embodiments, the position information is written at a frequency between about 50 Hz and 5MHz. The rotational speed of the disc during such writing is preferably lower than operational speeds to reduce disc flutter and other undesirable effects. Techniques can be employed to write the servo information on the discs despite deviations in the position information from a perfect circle centered about the spindle's axis of rotation.

Embodiments of the present invention are particularly useful for all disc drive and especially for those drives, employing track densities of 20,000 TPI or more. However, embodiments of the invention are useful for virtually any storage device having multiple storage media units, such as disks, where position information is embedded within the media.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, various types of information patterns can be thermally or otherwise written to the disc surface in accordance with the present invention. The disc can be a traditional magnetic disc or a magneto-optical disc, for example. Various types of recording heads can be used, such as inductive heads and magneto-resistive heads. Also, various types of light sources, beam deflectors or scanners, magnetic field sources can be used with the invention. The particular process steps and order of steps can be modified as desired. Other modifications can also be made.

What is claimed is:

1. A method of manufacturing a disc drive having a disc assembly, the method comprising steps of:
    (a) writing position reference information on a reference disc surface of the disc assembly at a radial interval greater than a radial interval between data tracks on the disc surface before the disc assembly is mounted within the disc drive;
    (b) assembling the disc assembly into the disc drive;
    (c) writing servo information on a selected disc surface of the disc assembly based upon the pre-written position reference information, while the disc assembly is mounted within the disc drive; and
    (d) erasing at least a portion of the position reference information.

2. The method of claim 1, and further comprising the step of:
    (e) upon the servo information being written upon the selected disc surface, writing servo information on another disc surface of the disc assembly.

3. The method of claim 1, wherein step (a) is performed while the disc assembly is coupled to an air bearing spindle.

4. The method of claim 1, wherein the disc assembly has an operational rotational speed, and wherein step (a) is performed by rotating the disc assembly at a rotational speed that is different than the operational rotational speed of the disc assembly in the disc drive.

5. The method of claim 1, wherein upon completion of step (a), the position reference information covers substantially all of the reference disc surface spaced by the radial interval greater than the radial interval between data tracks on the disc surface.

6. The method of claim 1, wherein the reference disc surface and the selected disc surface are the same disc surface.

7. The method of claim 6, wherein the servo information is written over at least a portion of the position reference information.

8. The method of claim 1, wherein step (c) further includes characterizing non-repeatable runout of the disc assembly and reducing the effects of runout on the servo information.

9. The method of claim 1, wherein the position reference information is a phase pattern.

10. The method of claim 1, wherein the position reference information is a null pattern.

11. The method of claim 1, wherein the disc assembly includes a plurality of discs.

12. The method of claim 1, wherein the servo information written during step (c) is written at a track density in excess of about 20,000 tracks per inch (7874 tracks per centimeter).

13. A method of manufacturing a disc drive having a disc assembly with a plurality of disc surfaces, the method comprising:

(a) a step for writing position reference information on a reference disc surface of the disc assembly at a radial interval greater than a radial interval between data tracks on the disc surface before the disc assembly is mounted within the disc drive;

(b) a step for assembling the disc assembly into the disc drive;

(c) a step for writing servo information on a selected disc surface of the disc assembly based upon the position reference information, while the disc assembly is mounted within the disc drive; and (d) a step for erasing at least a portion of the position reference information.

14. A disc drive manufactured according to the method of claim 13, wherein upon completion of step (d), the reference disc surface is substantially free of position reference information.

* * * * *